United States Patent
De Biasi et al.

(10) Patent No.: US 9,145,052 B2
(45) Date of Patent: Sep. 29, 2015

(54) VEHICLE FUEL TANK MOUNTING ASSEMBLY AND INSTALLATION METHOD

(71) Applicant: DBG, Mississauga (CA)

(72) Inventors: Attilio De Biasi, Caledon (CA); Tim Urech, Thornton (CA); Luciano Ballestrin, Mississauga (CA)

(73) Assignee: DBG, Mississauga (CA)

( * ) Notice: Subject to any disclaimer, the term of this patent is extended or adjusted under 35 U.S.C. 154(b) by 116 days.

(21) Appl. No.: 13/653,860

(22) Filed: Oct. 17, 2012

(65) Prior Publication Data

US 2014/0103628 A1    Apr. 17, 2014

(51) Int. Cl.
| | |
|---|---|
| *F16M 11/04* | (2006.01) |
| *B60K 15/07* | (2006.01) |
| *F16M 11/00* | (2006.01) |
| *A47F 5/00* | (2006.01) |
| *F16M 13/02* | (2006.01) |
| *F16B 21/09* | (2006.01) |
| *B60P 3/22* | (2006.01) |
| *B60K 15/067* | (2006.01) |
| *B60K 15/063* | (2006.01) |

(52) U.S. Cl.
CPC . *B60K 15/07* (2013.01); *A47F 5/00* (2013.01); *B60K 15/067* (2013.01); *B60P 3/22* (2013.01); *F16B 21/09* (2013.01); *F16M 11/00* (2013.01); *F16M 11/04* (2013.01); *F16M 13/02* (2013.01); *B60K 2015/0636* (2013.01); *B60Y 2200/14* (2013.01); *Y10T 29/49947* (2015.01)

(58) Field of Classification Search
CPC .......... B60P 3/22; F16M 11/00; F16M 11/04; F16M 13/02; A47F 5/00; F16B 21/09
USPC .......... 280/834; 248/503, 346.03, 674, 230.1, 248/205.1, 220.21, 221.11, 221.12
See application file for complete search history.

(56) References Cited

U.S. PATENT DOCUMENTS

| | | | | |
|---|---|---|---|---|
| 2,074,523 | A * | 3/1937 | Thwaits | 280/838 |
| 2,090,059 | A * | 8/1937 | McClane | 248/580 |
| 2,368,929 | A * | 2/1945 | King | 24/279 |
| 4,357,027 | A * | 11/1982 | Zeitlow | 280/834 |
| 4,610,453 | A * | 9/1986 | Collier | 280/834 |
| 5,267,714 | A * | 12/1993 | Nelson, II | 248/222.51 |
| 6,347,678 | B1 * | 2/2002 | Osborn et al. | 180/68.5 |
| 6,378,823 | B1 * | 4/2002 | Edholm | 248/219.4 |
| 6,565,048 | B1 * | 5/2003 | Meyer | 248/58 |

(Continued)

FOREIGN PATENT DOCUMENTS

| | | | |
|---|---|---|---|
| DE | 19939968 | A1 * | 3/2001 |
| JP | 11310043 | A * | 11/1999 |

*Primary Examiner* — Joseph Rocca
*Assistant Examiner* — Daniel Yeagley
(74) *Attorney, Agent, or Firm* — Aaron Edgar

(57) ABSTRACT

A fuel tank mounting assembly for mounting on a vehicle frame rail and method of installing the assembly on the vehicle frame rail to optimize the vehicle assembly line to allow for shorter takt time for the fuel tank mounting. The fuel tank mounting assembly includes a fuel tank, support brackets that each have two supporting tabs, and tank strap assemblies that attach to the support brackets to secure the fuel tank to the tank support brackets. Receiver brackets are attached to the frame rail of the vehicle, and the receiver brackets have two alignment notches that are sized to receive the two tabs of the fuel tank support brackets to couple the fuel tank to the vehicle for later permanent attachment, particularly at a subsequent assembly line station.

8 Claims, 4 Drawing Sheets

(56) References Cited

U.S. PATENT DOCUMENTS

2002/0005312 A1* 1/2002 Gollungberg ................ 180/314
2006/0006635 A1* 1/2006 Sonderegger ................ 280/830
2008/0168622 A1* 7/2008 Hsu ................................ 16/319
2009/0114784 A1* 5/2009 Tam ........................... 248/205.1
2013/0334381 A1* 12/2013 Vargo et al. .................. 248/201

* cited by examiner

VEHICLE FUEL TANK MOUNTING ASSEMBLY AND INSTALLATION METHOD

FIELD

The present disclosure relates generally to a vehicle fuel tanks. More particularly, the disclosure relates to the mounting assembly and installation of vehicle fuel tanks.

BACKGROUND

The installation of fuel tanks on vehicles can be a time consuming and man power intensive process on the main vehicle assembly line. Typically, as each vehicle is moved into the fuel tank installation portion of the assembly line, a hanger bracket was bolted to the frame rail and then line personnel physically moved the fuel tank up to the hanger bracket and while holding the tank against the bracket, wrapped tank straps with linking bolts around the tank. Each tank strap was fastened at one end with bolting through the frame rail side member and the other end with bolting to the hanger bracket. This process is cumbersome due to the bulky nature of the fuel tank. Time was required to align the fuel tank so that access points such as the filling point were properly situated. Fuel tank mounted entry/egress steps could only be installed after tank installation on the vehicle.

In vehicle assembly lines there is a certain period of time that a vehicle spends at each station that is referred to as the takt time. Using shorter takt times improves the rate of production of the vehicle assembly line. Fuel tank installation, due to its time consuming nature, is an area of the vehicle assembly line that limit the shortest possible takt time and thus the rate of production of the vehicle assembly line.

SUMMARY

Accordingly, a fuel tank mounting assembly for mounting on a frame rail of a vehicle is provided to allow hooking the fuel tank to a receiver bracket mounted on the frame rail for later permanent attachment to the vehicle. A fuel tank mounting assembly for mounting on a frame rail of a vehicle is provided comprising a fuel tank; two fuel tank support brackets, a top portion of each of the two fuel tank support brackets defining two tabs; two tank strap assemblies, each tank strap assembly attaches to a corresponding one of the two fuel tank support brackets to surround the fuel tank and couple the fuel tank to the corresponding tank support bracket; and two receiver brackets attached to the frame rail of the vehicle, each receiver bracket having two alignment notches sized to receive the two tabs of the fuel tank support brackets to couple the fuel tank to the vehicle for later permanent attachment. In some embodiments, the two fuel tank support brackets can have a mating channel and each of the two receiver brackets can be sized to mate with the mating channel. In particular, the two receiver brackets can each comprise two flanges that mate with an inner surface of the mating channel, and the flanges can also define the alignment notches. In some embodiments, the receiver brackets can have a reinforcement tube disposed between the flanges, the reinforcement tube aligns with holes in the mating channel for receiving an attachment means to permanently attach the fuel tank to the vehicle. In still other embodiments, the tank support brackets can be formed as a hat channel that defines the mating channel, and the two alignment tabs can be defined by bending a top portion of legs of the hat channel into the mating channel. In still other embodiments, the tank supporting surface of the hat channel can engage with an alignment depression in the fuel tank. In still other embodiments, the tank strap assemblies can comprise a T-bolt for tightening the tank strap assembly around the fuel tank, and the tank strap assemblies can include a step bracket for mounting an ingress/egress step.

In another aspect, a fuel tank assembly is provided that includes two tank support brackets having a channel defined therein; and two supporting tabs extending perpendicular to a longitudinal axis of the channel. In some embodiments, the supporting tabs extend within the channel from opposing channel legs.

In yet another aspect, a method of installing a fuel tank assembly on a vehicle on a vehicle assembly line is provided, the method comprises mounting the fuel tank assembly at a first assembly line station to at least two vehicle-mounted receiver brackets, the fuel tank having at least two tank supporting brackets each having two alignment tabs that mate with at least two alignment notches of each of the vehicle-mounted receiver brackets, the alignment tabs mating with the alignment notches to support the fuel tank assembly; and permanently securing the fuel tank assembly at a subsequent assembly line station to the at least two vehicle-mounted receiver brackets using an attachment means.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

Figure 1:
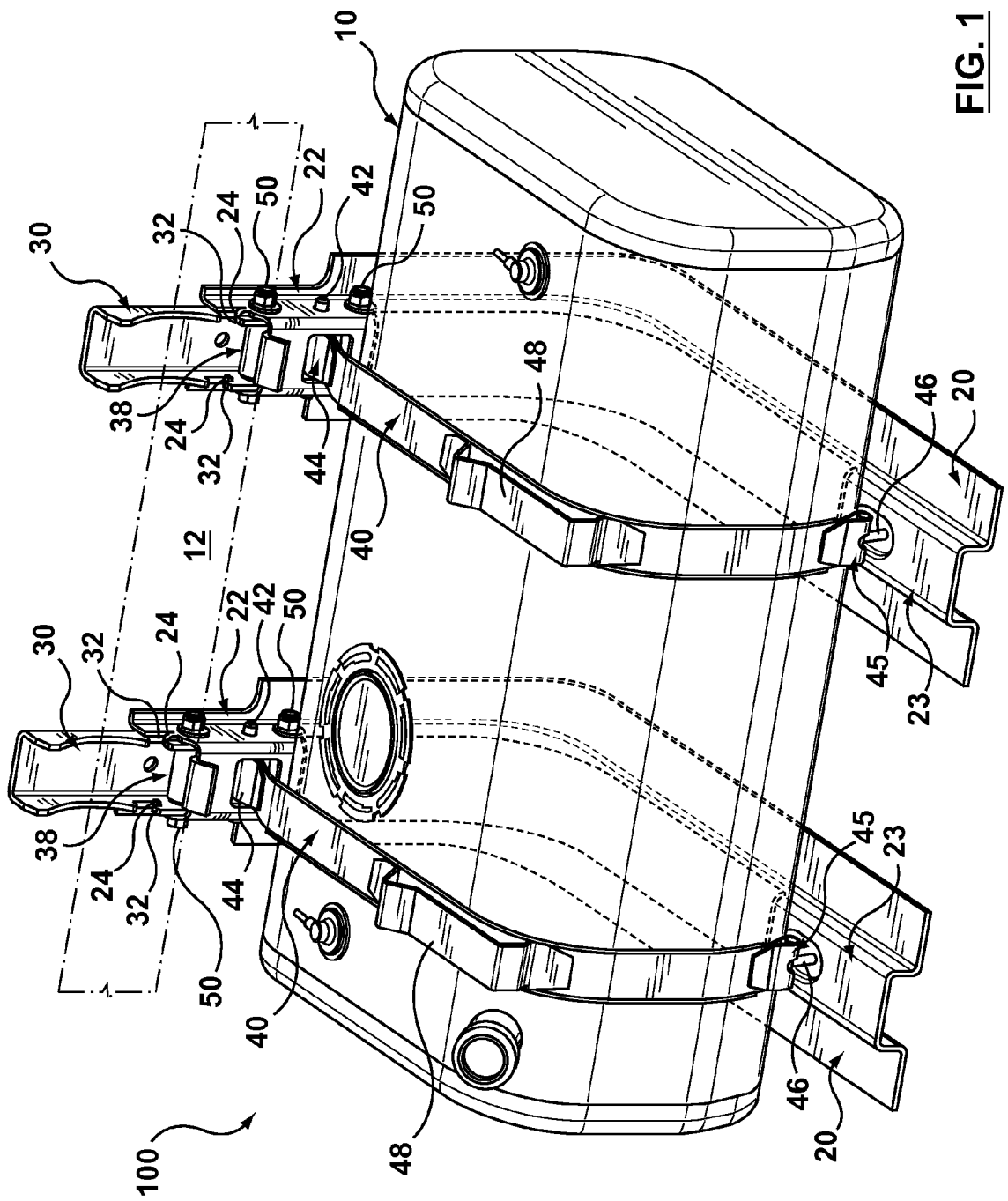
FIG. 1 is a perspective view of an embodiment of a fuel tank mounting assembly to attach a fuel tank assembly to a vehicle frame rail.

Referring now to the drawings in greater detail, FIG. 1 illustrates a fuel tank mounting assembly 100 installed to a vehicle frame rail 12. Fuel tank mounting assembly 100 is generally comprised of four types of main components: a fuel tank 10; at least two tank support brackets 20; at least two receiver brackets 30; and at least two tank strap assemblies 40. Larger fuel tanks can use multiple sets of tank support brackets 20; receiver brackets 30, and tank strap assemblies 40. Each tank support bracket 20 is combined with a tank strap assembly 40, as will be described in more detail below, to encircle fuel tank 10. Receiver brackets 30 are installed to vehicle frame rail 12. Next, fuel tank 10 including tank support brackets 20 and tank strap assemblies 40 is moved into position so that tank support brackets 20 engage with receiver brackets 30. Fuel tank 10 can be coupled to tank support brackets 20 using tank strap assemblies 40 away from the assembly line so that this unit (referred to herein as a fuel tank assembly) can be brought to the assembly line as a single unit to speed up fuel tank installation time.

Referring now to FIGS. 1-5, tank support brackets 20 are illustrated each having a top portion 22 that each define two supporting tabs 24. Receiver brackets 30 each have two alignment notches 32 that are sized to receive supporting tabs 24 when tank support brackets 20 engage with receiver brackets 30. Supporting tabs 24 can support the fuel tank 10 on alignment notches 32 of receiver bracket 30 without additional attachment mechanisms. This allows fuel tank 10 to be coupled to frame rail 12 in a shorter takt time because the step of permanently attaching support bracket 20 to receiver bracket 30 can be moved to a subsequent takt time.

Alignment notches 32 can have a rectangular shape that includes a horizontal supporting edge 32a that supporting tabs 24 rest upon when support brackets 20 mate with receiver brackets 30. Alignment notches 32 can also have a front edge 32b and rear edge 32c that forms an interference fit with corresponding edges 24b and 24c of supporting tabs 24. Front edge 32b should have a sufficient length to prevent supporting tabs 24 from being jostled from alignment notches 32.

Tank support brackets 20 have a mating channel 26 that is sized to mate with receiver brackets 30. Mating channel 26 provides vertical alignment of fuel tank assembly during installation and provides for increased stability prior to permanent attachment to receiver brackets 30. Each receiver bracket 30 has a mounting portion 34 that defines a hole 35 for attaching receiver brackets 30 to vehicle frame rail 12. Receiver brackets 30 further include flanges 36 that extend from mounting portion 34. Width between flanges 36 of receiver brackets 30 can be sized to engage with legs 27 of mating channel 26.

Preferably, width between legs 27 is greater than width between flanges 36 to allow receiver brackets 30 to fit within mating channel 26 of support brackets 20. Supporting tabs 24 extend into the mating channel 26 to engage with alignment notches 32 defined in flanges 36 of receiver brackets. Supporting tabs 24 are disposed inwardly and can be formed by bending legs 27 into the mating channel 26 at a top portion 22 of supporting brackets 20. Alternatively, mating channel 26 could fit in between flanges 36 of receiver brackets 30 and support tabs 24 could extend outwardly to engage the alignment notches 32 defined in flanges 36.

Figure 2:
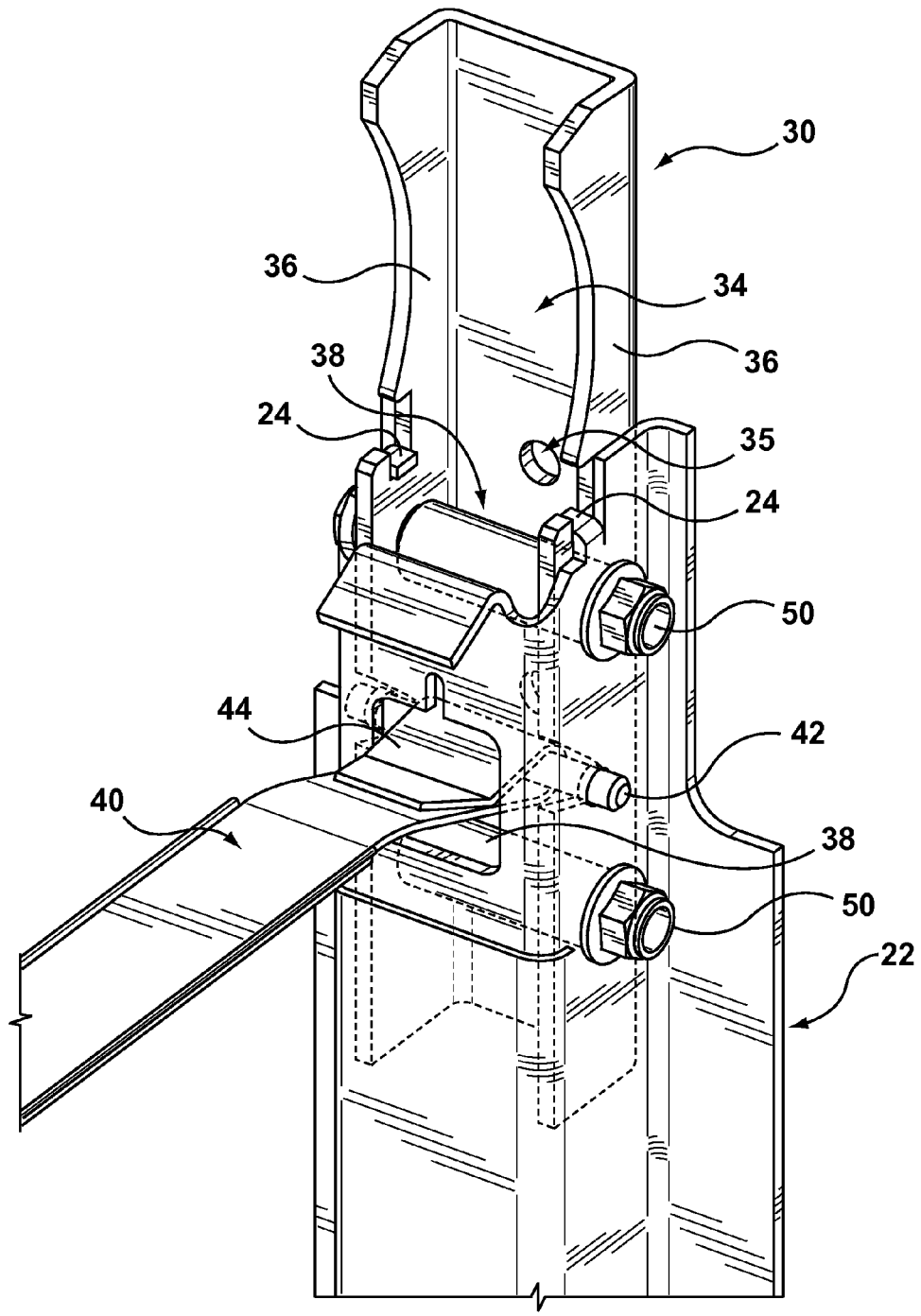
FIG. 2 is a perspective view of the receiver bracket and the top portion of the tank support bracket of FIG. 1.
Figure 3:
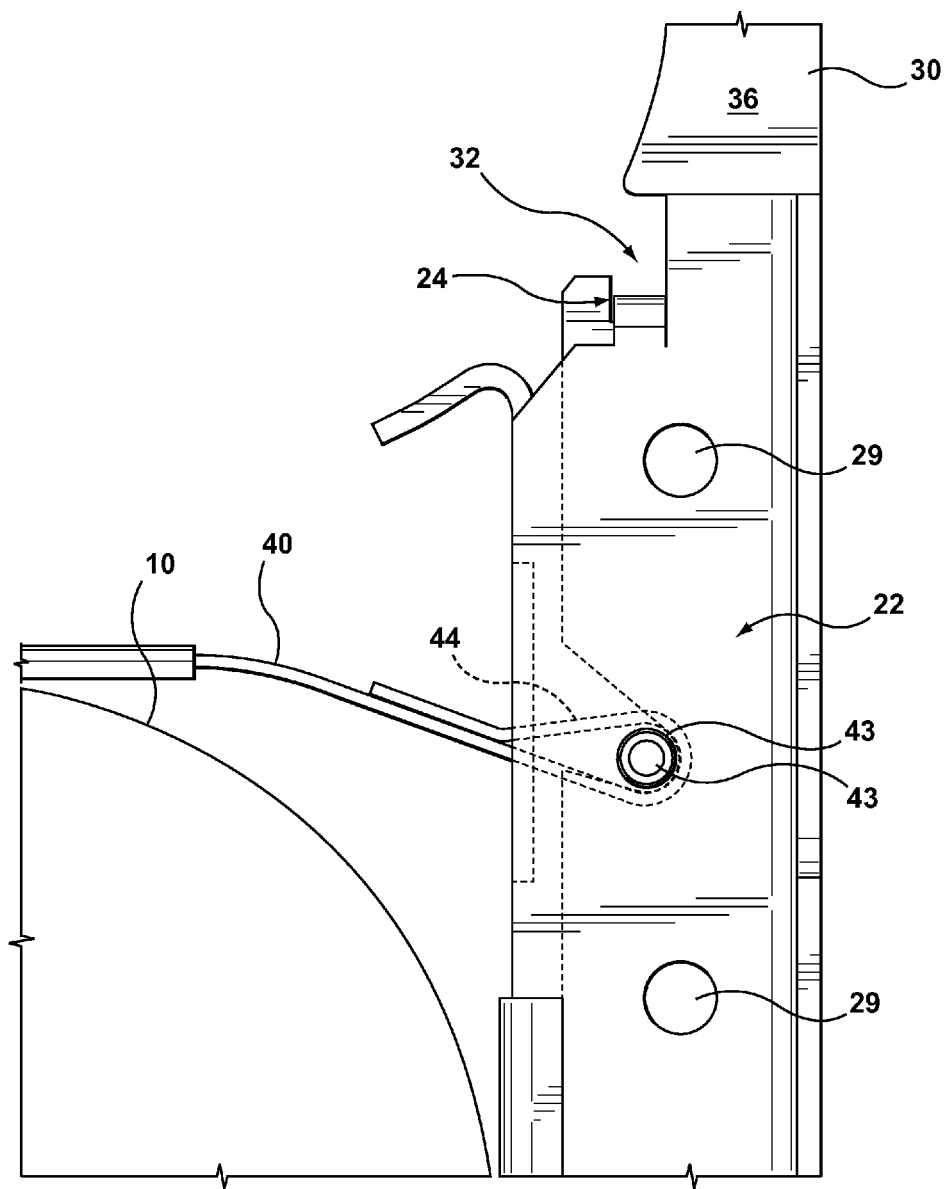
FIG. 3 is a side view the receiver bracket and the top portion of the tank support bracket of FIG. 2.
Figure 4:
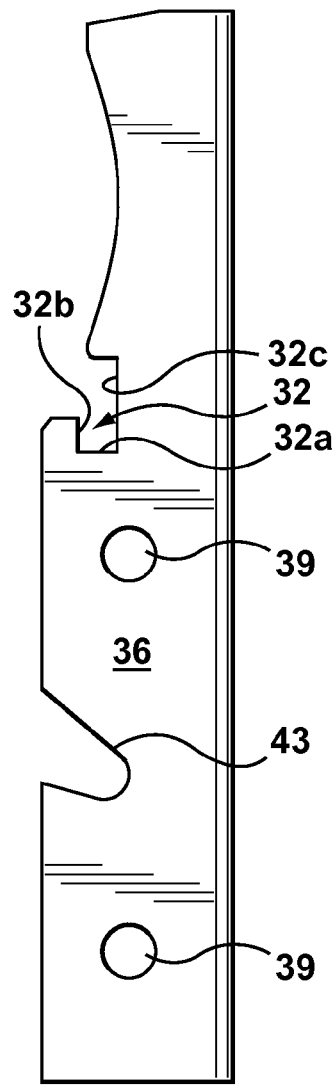
FIG. 4 is a side view of the receiver bracket of FIG. 1.
Figure 5:
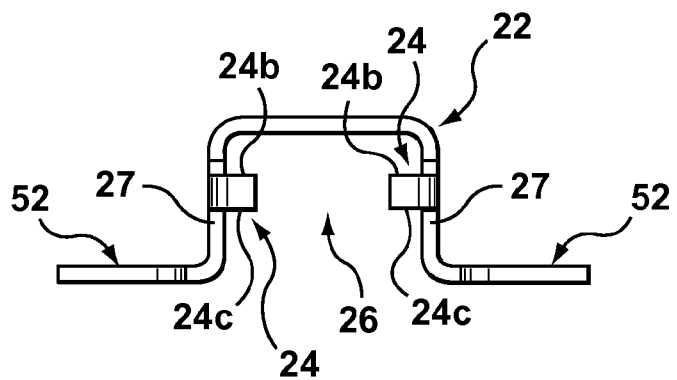
FIG. 5 is a top profile view of the mating channel of the top portion of the tank support bracket of FIG. 1.

Supporting tabs 24 are integral with tank support brackets 20 to provide a more cost efficient temporary mounting solution of the fuel tank assembly to those known in the art. Supporting tabs 24 are formed from legs 27 of mating channel 26 to define a small projection or flap, preferably rectangular in shape, that extends substantially perpendicular from the surface of legs 27. Supporting tab 24 can be formed by cutting a flap into leg 27 and bending the flap at a 90 degree angle into mating channel 26. FIGS. 1-3 illustrate supporting tabs 24 that are formed at the top end of tank support brackets 20. In other embodiments, supporting tabs 24 can be formed anywhere along top portion 22 of tank support brackets 20 by making a U-shaped cut to define the flap into legs 27 and then bending the flap 90 degrees inward into mating channel 26.

The term "integral", and its derivations, are used herein to indicate a part that is fabricated from a single piece of material. The term "integral" as used herein specifically excludes other means for maintaining parts fixed together as a single unit. More particularly, the term "integral" is used with tank support brackets 20 to specifically exclude known variations where tank support brackets 20 include additional mounting hardware, such as a pin, that support the fuel tank assembly. The use of supporting tabs 24 integral with tank support brackets 20 provides improved cost efficiency and a stable temporary mounting solution for the fuel tank assembly.

Receiver brackets 30 can further include reinforcement tubes 38 that are disposed between flanges 36. Reinforcement tubes 38 align with holes 39 in flanges 36 that also aligns with attachment holes 29 in legs 27 of top portion 22 of support brackets 20 when fuel tank assembly is aligned on receiver brackets 30. An attachment means 50 can then be placed through aligned holes 29, 39 and reinforcement tubes 38 to permanently attach the fuel tank assembly to the vehicle frame rail 12. Attachment means 50 can include a bolt or similar fastener. Reinforcement tubes 38 can be welded to flanges 36 of receiver brackets 30.

Tank support brackets 20 can be formed by stamping to define mating channel 26. Mating channel 26 can be a hat channel, named to reflect its hat like appearance, as illustrated in the profile shown in FIG. 5. A hat channel comprises two horizontal outward wings 52 (the brim) and two vertical legs 27 (the sides of the hat) giving it the appearance similar to the side view of a top hat. From a 3 dimensional perspective, the top of the hat channel reveals a flat, horizontal surface (the hat's top). Hat channels can also be described as a Roll Formed Metal U-Channel with a bottom horizontal web and 2 vertical legs with outward flanges. These outward flanges can also be called wings or fins. A hat channel is provided as an example but other mating channel 26 profiles can be used.

Tank support brackets 20 can have all required fasteners welded in place. Tank support bracket 20 can be coated with e-coat and powder top coat, and a PVC liner can be applied to tank supporting surfaces prior to assembly. Outer surfaces of fuel tank 10 can include an alignment depression that engages the tank supporting surfaces of tank support brackets 20. Legs 27 of mating channel 26 can extend into the alignment depression in fuel tank 10 to position support brackets 20 in alignment with fuel tank 10.

Fuel tank assembly, including fuel tank 10, tank support brackets 20, and tank strap assemblies, can be built away from vehicle assembly line and transported to the assembly line as a single unit. Fuel tank assembly is built by securing fuel tank 10 to tank support brackets 20 using tank strap assemblies 40. Tank strap assemblies 40 can be coupled to top portion 22 of tank support brackets 20 using strap pin 42 that passes through top portion 22 of tank support bracket 20 to engage a loop 44 formed at one end of tank strap assembly 40. A similar loop 45 can be formed at the opposite end of tank strap assembly 40 to secure a T-bolt 46 that is used to fasten opposite end of tank strap assembly 40 to a lower portion 23 of tank support brackets 20. Tightening T-bolt 46 of tank strap assembly 40 secures fuel tank 10 to tank support brackets 20.

Tank strap assembly 40 can further include a step bracket 48 that is welded to tank strap assembly 40. Step bracket is configured to have an ingress/egress step (not shown) fastened thereto. The step can be part of the fuel tank assembly for installation on the assembly line or the step can be separate component that is installed elsewhere on the assembly line. Tank strap assemblies 40 can have the ends welded to form loops 44, 45. Tank strap assemblies can also be coated with e-coat and a powder top coat. Tank strap assemblies 40 can further include a PVC liner that is installed prior to assembly of fuel tank assembly.

Receiver brackets 30 can further include a strap pin slot 43 for receiving strap pin 42 when mating tank support brackets 20 to receiver brackets 30. Strap pin slot 43 can be a downward angled slot that helps support the weight of the fuel tank assembly along with alignment tabs 24.

The fuel tank assembly can be installed on the assembly line by mounting the fuel tank assembly to vehicle-mounted receiver brackets 30. This can be performed at an assembly line station, and then at a later assembly line station, attachment means, such as a bolt can be used to permanently attach the fuel tank assembly to the vehicle. This allows the fuel tank assembly to mounted to the vehicle in a short takt time period by distributing the mounting and permanently attaching steps between assembly line stations. Supporting tabs 24 of tank support brackets are received in alignment notches 32 of receiver brackets 30 to secure and support the fuel tank assembly to vehicle frame rail 12.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A fuel tank mounting assembly for mounting on a frame rail of a vehicle, comprising:
   a fuel tank;
   two fuel tank support brackets each having a mating channel formed between two opposing vertical legs to provide vertical alignment, a top portion of the mating channel having two tabs, each of the two tabs are integrally fabricated from a corresponding leg of the mating channel by cutting a flap in the leg and bending the flap inward and perpendicular to the mating channel to form the tab;
   two tank strap assemblies, each tank strap assembly attaches to a corresponding one of the two fuel tank support brackets to surround the fuel tank and couple the fuel tank to the corresponding tank support bracket; and
   two receiver brackets each having a mounting portion that defines a hole for attaching to the frame rail of the vehicle, each receiver bracket having flanges that extend away from the mounting portion, the width between the flanges sized to engage an inner surface of the corresponding vertical legs of the corresponding mating channel of the tank support bracket, each receiver bracket having two alignment notches defined within the flanges, the alignment notches sized to receive the two tabs of the mating channel to couple the fuel tank to the vehicle for later permanent attachment, the alignment notches having a horizontal supporting edge, a front edge, and a rear edge, the horizontal supporting edge supports the tab of the fuel tank support bracket to support the fuel tank prior to securing the tank support brackets to the receiver brackets, the front edge and rear edge forming an interference fit with the corresponding tab to provide alignment and prevent movement prior to securing.

2. The fuel tank mounting assembly of claim 1, wherein each of the two receiver brackets has a reinforcement tube disposed between the flanges, the reinforcement tube aligns with holes in the mating channel for receiving an attachment means to permanently attach the fuel tank to the vehicle.

3. The fuel tank mounting assembly of claim 1, wherein each of the two fuel tank support brackets is a formed hat channel.

4. The fuel tank mounting assembly of claim 3, wherein the formed hat channel defines the mating channel and each of the two tabs are defined by bending a top portion of legs of the hat channel into the mating channel.

5. The fuel tank mounting assembly of claim 1, wherein each of the tank strap assemblies comprise a T-bolt for tightening the tank strap assembly around the fuel tank.

6. The fuel tank mounting assembly of claim 5, wherein each of the tank strap assemblies comprise a step bracket for an ingress/egress step.

7. A method of installing the fuel tank mounting assembly of claim 1, on the vehicle on a vehicle assembly line, the method comprising:
   mounting the fuel tank mounting assembly at a first assembly line station to at least two vehicle-mounted receiver brackets, the two tabs mating with the two alignment notches of the corresponding vehicle-mounted receiver bracket to support the fuel tank assembly; and
   permanently securing the fuel tank mounting assembly at a subsequent assembly line station to the at least two vehicle-mounted receiver brackets using an attachment means.

8. The method of installing a fuel tank assembly of claim 7 wherein the attachment means is a bolt.

* * * * *